F. S. DENISON.
PRESSURE REGULATOR.
APPLICATION FILED JUNE 29, 1916.

1,228,188.

Patented May 29, 1917.

2 SHEETS—SHEET 1.

WITNESSES
M. R. McLuinio
Q. E. Sorensen

INVENTOR
FREDERICK S. DENISON
BY Paul & Paul
ATTORNEYS

F. S. DENISON.
PRESSURE REGULATOR.
APPLICATION FILED JUNE 29, 1916.
1,228,188.
Patented May 29, 1917.
2 SHEETS—SHEET 2.
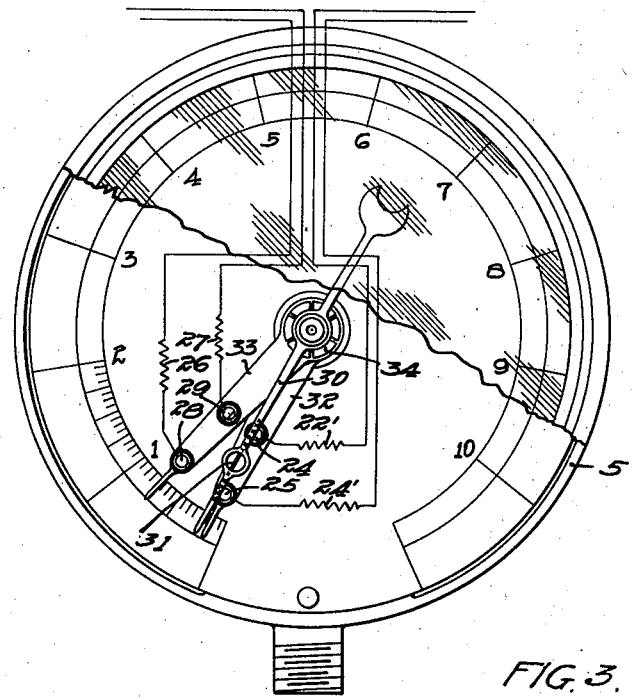
FIG. 3.
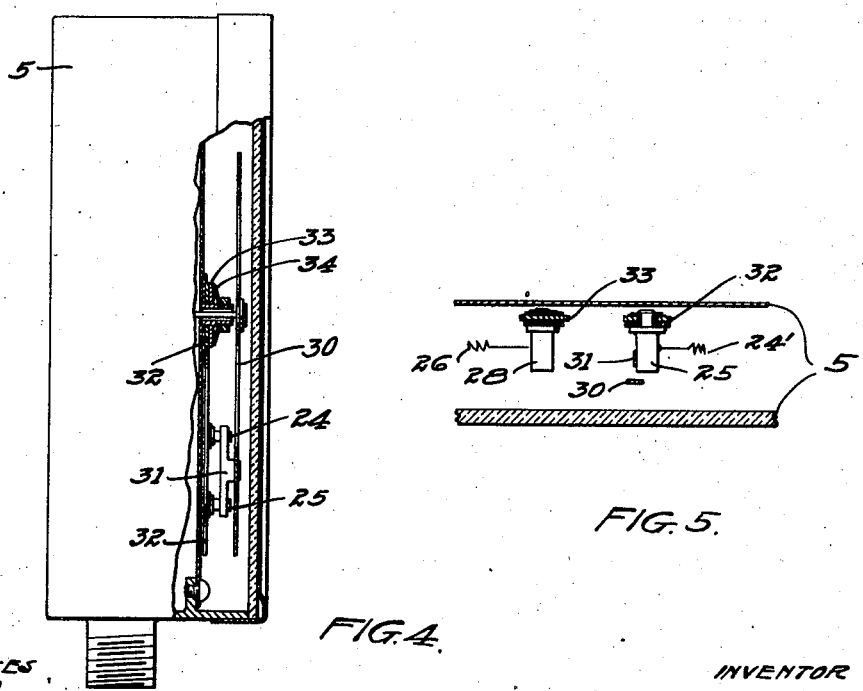
FIG. 4.
FIG. 5.
WITNESSES
INVENTOR
FREDERICK S. DENISON
BY
ATTORNEYS

UNITED STATES PATENT OFFICE.

FREDERICK S. DENISON, OF MINNEAPOLIS, MINNESOTA, ASSIGNOR TO MINNEAPOLIS HEAT REGULATOR COMPANY, OF MINNEAPOLIS, MINNESOTA, A CORPORATION.

PRESSURE-REGULATOR.

1,228,188.　　　　　Specification of Letters Patent.　　Patented May 29, 1917.

Application filed June 29, 1916. Serial No. 106,710.

*To all whom it may concern:*

Be it known that I, FREDERICK S. DENISON, a citizen of the United States, resident of Minneapolis, county of Hennepin, State of Minnesota, have invented certain new and useful Improvements in Pressure-Regulators, of which the following is a specification.

In thermostatic devices used for regulating the dampers of a heating plant, it sometimes happens in a steam or vapor system that the pressure will increase beyond the point necessary for heating the room before the thermostat is affected sufficiently to shift the motor circuit and close the dampers. The result is that when the thermostat does finally change the circuit there will already be sufficient pressure generated to run the temperature of the room above the desired point, even though the dampers of the heater may be closed.

The object of my invention is to provide a pressure gage having means connected with the thermostatic circuit so that when the pressure reaches a predetermined point the circuit will be closed through the motor to shut off the draft, even though the thermostatic bar may still be in contact with the "cold" side of the thermostat.

The invention consists generally in various constructions and combinations, all as hereinafter described and particularly pointed out in the claims.

Figure 1:
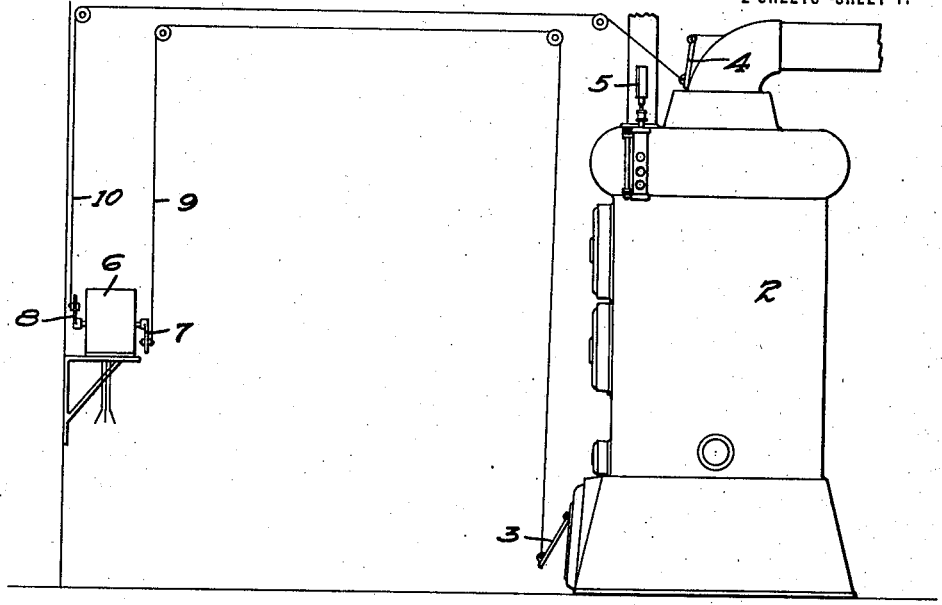
Figure 2:
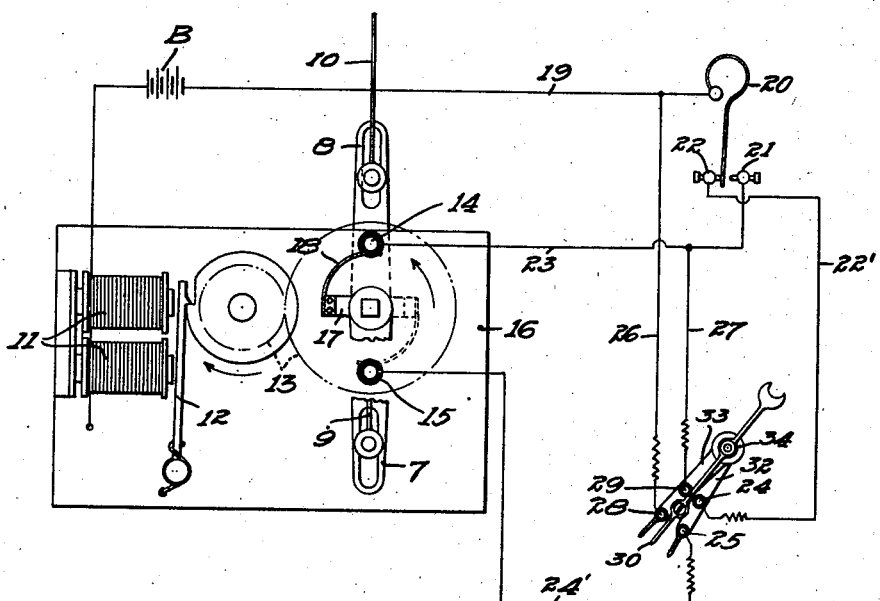

In the accompanying drawings forming part of this specification,

Figure 1 is an elevation of a heating plant illustrating the connection of a motor to the dampers of the plant, Fig. 2 is a diagrammatic view, showing the conductors between the motor, thermostat and pressure gage, Fig. 3 is a front view of a pressure gage with the dial broken away, showing the position of the contact points with respect to the indicator hand, Fig. 4 is an edge view of the pressure gage, partially in section, showing the contact closing tongue carried by the indicator hand, Fig. 5 is a detail sectional view, through the arms on which the circuit closing posts of the indicator hand are mounted.

In the drawing, 2 represents a steam boiler having a draft damper 3, a check damper 4, and pressure gage 5 mounted thereon. 6 is a spring motor of ordinary construction, having its crank arms 7 and 8 connected through cables 9 and 10 with the draft and check dampers.

The motor has the usual electro-magnets 11 and armature 12 positioned to lock the train of gears 13 temporarily until the magnets are energized and the armature attracted. Insulated contact posts 14 and 15 are mounted on the base 16 of the motor, which is grounded and an arm 17 carries a contact spring 18 to engage the posts 14 and 15 alternating with each half revolution of the motor shaft and crank arms 7 and 8. An electric conductor 19 leads through a battery B to the electro-magnets, one of which is grounded through the plate 16, the other end conductor 19 being connected to a thermostatic bar 20 that is movable between contact posts 21 and 22. A conductor 23 leads from the post 14 to the thermostat post 21. A conductor 22' leads from the other post 22 to an insulated post 24 mounted on the face of the gage 5 and a conductor 24' leads from another post 25 on said face to the contact post 15 of the motor. Branch conductors 26 and 27 lead respectively from the conductors 19 and 23 to contact posts 28 and 29 on the face of the dial. An indicator hand 30 is movable over the graduations of the dial and is provided with a tongue 31 of flexible conducting material, that is adapted to contact with the pair of posts 24 and 25 when the indicator hand moves in one direction and in a similar manner with the posts 28 and 29 when the indicator hand moves in the other direction. When this tongue contacts with the posts 24 and 25 it closes the circuit between the conductors 22' and 24' and when it contacts with the posts 28 and 29 it bridges the gap between the conductors 19 and 23, closing the circuit therethrough independently of the thermostat. By providing a permanent connection between the posts 24 and 25 the device can be used without a thermostat.

The posts on the dial are mounted on arms 32 and 33 which are concentric with the indicator hand 30 and are held against accidental or premature movement by a friction washer 34. This allows the arms, with the contact posts carried thereby to be moved back and forth on the face of the dial for increasing or decreasing the distance between them and regulating the travel of the indicator hand before closing the circuit.

In using the device, the operator will set the arm 33 opposite the figure on the dial indicating the number of pounds or ounces pressure which may be generated before the circuit is closed through the motor and the dampers changed. The operator will also set the pointer 32 at the minimum pressure desired. Then, assuming that the dampers are open and the thermostat on the "cold" side, it follows that when the pressure has been generated to a point where the indicator hand will engage the tongue 31 with the posts 28 and 29 the circuit will be closed independently of the thermostat and the dampers shut. This has the effect of cutting out the thermostat in case the pressure reaches a predetermined degree before the thermostat is affected to change the dampers, but in case the room reaches the desired temperature before the pressure rises sufficiently to change the dampers through the gage, then the circuit will be closed through the thermostat, which will operate to close the draft in the ordinary way.

When dependence is placed entirely upon the thermostat it sometimes happens that with a quick fire the pressure will rise far beyond the point necessary for heating the room and after the thermostat has closed the dampers the temperature may continue to rise, resulting from this surplus of steam generated. With this device there is no chance for excess generation of steam. The circuit is closed to shut the dampers when the indicator hand of the thermostat reaches a certain degree, even though the thermostat may not change until later, but when the pressure gage has closed the dampers it will not open them again until the current is closed through the thermostat on the low temperature side.

I claim as my invention:

1. A heat regulating device comprising a motor, a thermostat having contact points in circuit with said motor, a pressure gage and indicator hand therefor, arms mounted on said gage, contact posts mounted in pairs on said arms upon opposite sides of said hand and having electric conductors in circuit with the conductors of said thermostat and said motor, said indicator hand having means for closing the circuit between the posts of said arms for shifting said motor when the pressure in said gage reaches a predetermined degree.

2. A heat regulating device comprising a motor, a thermostat having contact points in circuit with said motor, a pressure gage and indicator hand therefor, a pair of arms mounted on said gage concentric with said indicator hand and adjustable back and forth on the face of said gage, a pair of contact posts carried by each of said arms and in circuit with said thermostat and motor, said indicator hand having means for contacting with each pair of posts for closing the circuit between them through said motor independently of said thermostat.

3. A heat regulating device comprising a motor, a thermostat and circuit therefor, a pressure gage and indicator hand, arms mounted on said gage and having contact posts arranged in pairs thereon in circuit with said thermostat, a substantially T-shaped tongue carried by said indicator hand and positioned to contact with the posts of each pair for closing the circuit between them when the pressure rises above a predetermined degree.

4. A heat regulating device comprising a thermostat, a motor, electric circuits therefor, a pressure gage and indicator hand, contact posts mounted in pairs upon opposite sides of said indicator hand and adjustable on the face of said gage and connected with said thermostat and motor circuits, said indicator hand having means for contacting with a pair of posts simultaneously.

In witness whereof, I have hereunto set my hand this 1st day of June 1916.

FREDERICK S. DENISON.